Patented June 12, 1951

2,556,335

UNITED STATES PATENT OFFICE 2,556,335

CORE BINDING MATERIAL FROM DRYING OILS

Franz Rudolf Moser, Hausen, near Brugg, Switzerland, assignor to Oel- und Chemie-Werk A. G., Hausen, near Brugg, Switzerland No Drawing. Application February 11, 1948, Serial No. 7,717. In Switzerland February 15, 1947

6 Claims. (Cl. 22—188)

This invention relates to a process for the improvement of binding material from drying oil, and more particularly to a process for improving the drying oils used as binding agents in making sand cores for foundry work.

For making complicated-shaped sand cores for foundry use it is a well-known method to use binders which harden at room temperature, thus enabling the core mixture to solidify while still in the core box. Oils of the drying or semi-drying type are mainly used for this purpose, e. g. linseed oil, Perilla oil, China-wood oil or oiticica oil. The rather long drying time required by the oils is a serious drawback as is also the fact, that the sand to be used has to be very carefully dried, since even traces of moisture tend to lengthen the time necessary for setting. Synthetic resins as e. g. amine resins as phenolaldehyde resins, another class of binders of the cold setting type, besides being rather expensive have the great disadvantage of causing dermatitis and producing noxious and evil smelling gases during baking and pouring.

It is the object of the present invention to improve to a substantial degree the properties of drying or semi-drying oils for producing sand cores by the addition of substances, which are capable of increasing considerably the speed of drying. My invention is based on the observation, that by the addition of substances capable of giving off oxygen, not only can the drying speed of drying oils or semi-drying oils be greatly increased, but within certain limits it may even be regulated at will. Furthermore, it has been found that such additions may alter the detrimental effect of moisture upon the drying process to such a degree, that small amounts of moisture in many cases may even enhance setting. It is a further advantage of such addition, that the cores show much less tendency to distort during baking.

According to the present invention, relatively small amounts of substances containing the peroxide group are added to the oil. These peroxide compounds used in carrying out the present invention may be either organic or inorganic. Examples of organic peroxides are: Alkyl derivatives of hydrogen peroxide like di-tertiary butylperoxide, di-tert.-amylperoxide, tetrahydronaphthalene peroxide, acylperoxides like acetylperoxide, benzoylperoxide, lauroylperoxide. Examples of suitable inorganic peroxides are: hydrogen peroxide; metal peroxides like those of sodium, barium or zinc, and salts containing the peroxide group, like the alkali-persulfates, perborates and sodium carbonate peroxide.

In most cases the cheap, and easily obtainable organic peroxides, ethylperoxide and benzoylperoxide, and the inorganic peroxide salts, sodium perborate and sodium carbonate peroxide are preferred.

Mixtures of peroxide substances may be used as well as solutions of peroxide substances.

The amount of peroxide substance to be used, is relatively small and should not exceed 20% by weight of the oil to be treated, preferably it lies below 5%.

The addition of the peroxide compound to the oil may take place in any convenient stage of the working or application of the oil, where rapid setting is desired. In making sand cores the peroxide compound is preferably added to the oil in the mixing machine together with the sand. In other cases, e. g. for protective coatings the peroxide compound may be incorporated as a dust spray onto the oil film already formed.

All of the peroxide compounds disclosed herein have the bivalent group —O—O—. It will be understood therefore that the term, peroxide, is used herein in the usual chemical sense and is limited to compounds having the bivalent group —O—O—.

The oils which may be used in carrying out the present invention include drying and semi-drying oils such as linseed-, tung-, Perilla-, oiticica-, dehydrated castor-, grapeseed-, soya-, tall-oil.

Mixtures of oils may also be used as well as fractions from such oils such as can be obtained by extraction with selective solvents. The oils may, prior to the addition of the substances containing the peroxide group, be modified by bodying, heat polymerisation, blowing with air, vulcanisation or isomerisation. Furthermore substances may be added to the oils, which are known as modifying agents like natural gums and rosins, ester gum or synthetic varnish resins. In many cases the use of oils containing conjugated double bonds is advantageous on account of their speed of drying and their excellent susceptibility to substances containing the peroxide group. Suitable oils with conjugated double bonds are tung oil, oiticica oil, dehydrated castor oil and isomerized oils. In most cases it is desirable to add the usual metal dryers to the oils to be used in carrying out the present invention.

Example I

To 3 kg. of linseed oil, containing 0.1% cobalt and 0.3% lead as naphthenates 0.09 kg. of sodium perborate are added and mixed together with 100 kg. of dry quartz sand. It is advisable to mix first the sand and perborate for a short while, then add the oil and mix thoroughly. A core made from a mixture consisting of 97% of quartz sand and 3% of the above mixture after remaining for five hours in the core box at room temperature, showed a shearing strength of 850 grams per square centimeter whereas a core made in exactly the same way, but without the addition of perborate gave 570 grams per square centimeter under the same conditions.

Example II

Working as in Example I, but using blown sunflower-seed oil instead of linseed oil, the core obtained with the addition of perborate after remaining in the core box over night at room temperature showed a shearing strength of 1750 grams per square centimeter against 1450 grams per square centimeter without addition of the peroxide.

Example III

Working as in Example I, using, however, oiticica-oil instead of linseed oil and sodium carbonate peroxide instead of sodium perborate the following results were obtained, the shearing strength being given in grams per square centimeter:

|  | Shearing strength | |
|---|---|---|
|  | after 2 hours | after 5 hours |
| without addition | (1) | 200 |
| with 1% peroxide | 3,000 | >4,000 |
| with 5% peroxide | 400 | >4,000 |

[1] Too soft for measuring.

Example IV

Working as in Example I, using however a bodied, dehydrated castor oil and benzoyl peroxide the time required for obtaining a shearing strength of 1800 grams per square centimeter was 5 hours with the addition of peroxide, and 10 hours without it.

I claim:

1. A process for producing sand cores for foundry work which comprises mixing foundry sand with a drying oil and a compound containing a peroxide group in an amount of about 1% to 20% by weight of said drying oil, forming a core and causing the same to harden at room temperature.

2. A process for producing sand cores for foundry work which comprises mixing foundry sand with a drying oil and an inorganic compound containing a peroxide group in an amount of about 1% to 20% by weight of said drying oil, forming a core and causing the same to harden at room temperature.

3. A process for producing sand cores for foundry work which comprises mixing foundry sand with a drying oil and an alkali carbonate peroxide in an amount of about 1% to 20% by weight of said drying oil, forming a core and causing the same to harden at room temperature.

4. A process for producing sand cores for foundry work which comprises mixing foundry sand with a drying oil containing conjugated double bonds and a compound containing a peroxide group in an amount of about 1% to 20% by weight of said drying oil, forming a core and causing the same to harden at room temperature.

5. A process for producing sand cores for foundry work which comprises mixing foundry sand with oiticica oil and a compound containing a peroxide group in an amount of about 1% to 20% by weight of said drying oil, forming a core and causing the same to harden at room temperature.

6. A new composition of matter, a core sand containing mixed therewith a binding agent comprising a drying oil and a peroxide compound present in a quantity of from about 1% to 20% by weight of said drying oil, which causes cores made therefrom to set up at room temperature.

FRANZ RUDOLF MOSER.

REFERENCES CITED

The following references are of record in the file of this patent:

UNITED STATES PATENTS

| Number | Name | Date |
|---|---|---|
| 1,975,399 | Malaspina | Oct. 2, 1934 |
| 2,298,271 | Auer | Oct. 13, 1942 |
| 2,391,042 | Stamberger | Dec. 18, 1945 |
| 2,399,697 | Stark | May 7, 1946 |
| 2,426,000 | Cutler | Aug. 19, 1947 |